(12) United States Patent
Furuya

(10) Patent No.: US 11,131,232 B2
(45) Date of Patent: Sep. 28, 2021

(54) COOLING SYSTEM OF INTERNAL COMBUSTION ENGINE

(71) Applicant: TOYOTA JIDOSHA KABUSHIKI KAISHA, Toyota (JP)

(72) Inventor: Yoshihiro Furuya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 16/701,762

(22) Filed: Dec. 3, 2019

(65) Prior Publication Data

US 2020/0240315 A1 Jul. 30, 2020

(30) Foreign Application Priority Data

Jan. 25, 2019 (JP) .............................. JP2019-011406

(51) Int. Cl.
| | |
|---|---|
| *F01P 7/14* | (2006.01) |
| *F16K 31/04* | (2006.01) |
| *H02K 26/00* | (2006.01) |

(52) U.S. Cl.
CPC .............. *F01P 7/14* (2013.01); *F16K 31/048* (2013.01); *H02K 26/00* (2013.01); *F01P 2007/146* (2013.01)

(58) Field of Classification Search
CPC .. F01P 2007/146; F16K 31/04; F16K 31/041; F16K 37/0041; F16K 31/042; G01L 3/00
USPC ..................................................... 123/41.08
See application file for complete search history.

(56) References Cited

U.S. PATENT DOCUMENTS

| | | | |
|---|---|---|---|
| 6,223,700 B1 | 5/2001 | Sano et al. | |
| 10,539,064 B2* | 1/2020 | Sato | ........................ F01P 7/14 |
| 2005/0211207 A1* | 9/2005 | Urushihata | ............. F01L 1/024 |
| | | | 123/90.17 |
| 2009/0314074 A1* | 12/2009 | Davidkovich | ...... G01M 15/042 |
| | | | 73/114.79 |
| 2016/0376977 A1 | 12/2016 | Watanabe | |
| 2017/0030251 A1 | 2/2017 | Watanabe | |
| 2018/0066567 A1 | 3/2018 | Kaneko et al. | |
| 2020/0318751 A1* | 10/2020 | Tanaka | ................ F16K 37/0041 |

FOREIGN PATENT DOCUMENTS

| | | |
|---|---|---|
| JP | H11-287123 A | 10/1999 |
| JP | 2017-008824 A | 1/2017 |
| JP | 2017-031817 A | 2/2017 |
| JP | 2018-040289 A | 3/2018 |

* cited by examiner

*Primary Examiner* — Long T Tran
*Assistant Examiner* — James J Kim
(74) *Attorney, Agent, or Firm* — Oliff PLC (57) ABSTRACT

A cooling system of an internal combustion engine includes a control valve that regulates the flow of a coolant in a circulation circuit, and an electronic control unit. The electronic control unit is configured to have the following functions: controlling the driving of a motor of the control valve; calculating a motor torque based on an effective voltage applied to the motor; calculating a valve body torque that is part of the motor torque, based on an angular acceleration rate of the motor; and calculating a driving stress based on a difference between the motor torque and the valve body torque.

13 Claims, 8 Drawing Sheets

FIG. 10

COOLING SYSTEM OF INTERNAL COMBUSTION ENGINE

CROSS-REFERENCE TO RELATED APPLICATIONS

This application claims priority to Japanese Patent Application No. 2019-011406 filed on Jan. 25, 2019, which is incorporated herein by reference in its entirety.

BACKGROUND

1. Technical Field

The present disclosure relates to a cooling system of an internal combustion engine.

2. Description of Related Art

Japanese Patent Application Publication No. 2018-40289 (JP 2018-40289 A) describes an example of an internal combustion engine cooling system including a control valve that controls the flow of a coolant, flowing inside the internal combustion engine, in a circulation circuit, and a control unit that controls the control valve. The control valve includes a housing, a valve body housed inside the housing, a motor controlled by the control unit, and a plurality of gears that transmits output torque of the motor to the valve body. The flow of the coolant in the circulation circuit can be controlled as the valve body is shifted through the driving of the motor.

SUMMARY

When the motor is driven to shift the valve body, stress may build up in gears disposed on a torque transmission path between the motor and the valve body. If stress keeps building up in the gears, the durability of the control valve will decrease. To infer the durability of the control valve, it is necessary to calculate the stress that the gears are subjected to when the motor is driven to shift the valve body. However, JP 2018-40289 A does not disclose a method for estimating and calculating the magnitude of such stress.

The present disclosure provides an internal combustion engine cooling system capable of calculating the stress that the gears are subjected to during driving of the motor.

An aspect of the present disclosure relates to an internal combustion engine cooling system including a control valve and an electronic control unit. The control valve is provided in a circulation circuit of a coolant flowing inside the internal combustion engine, and includes a housing, a valve body that shifts inside the housing, a motor, and a transmission mechanism that includes a plurality of gears meshing with one another and is configured to transmit an output of the motor to the valve body. The control valve is configured to control the flow of the coolant in the circulation circuit by driving the motor so as to shift the valve body. The electronic control unit is configured to have the following functions: (i) controlling the driving of the motor; (ii) calculating a motor torque that is a torque generated by the motor, based on an effective voltage applied to the motor; (iii) calculating a valve body torque that is part of the motor torque and that has been converted into a shift of the valve body, such that the calculated valve body torque is larger when an angular acceleration rate of the motor is higher; and (iv) calculating a driving stress that is a stress that the gears are subjected to when the motor is driven to shift the valve body, such that the calculated driving stress is larger when a difference between the motor torque and the valve body torque is larger.

When the motor is driven to shift valve body, the valve body may be slow to start shifting after output torque of the motor is input into the valve body, or a gap may occur between an actual shift speed of the valve body and a shift speed of the valve body that is commensurate with the output torque of the motor. In such cases, the motor torque is consumed as a force that presses the gears inside the transmission mechanism disposed between the motor and the valve body, which can cause stress build-up in the gears.

Torque output from the motor is input into the valve body through the transmission mechanism. Thus, there is a correlation between the shift speed of the valve body and the angular speed of the motor: The higher the angular acceleration rate of the motor, the larger the amount of increase in shift speed of the valve body. A large amount of increase in shift speed means that a large torque has been input from the motor into the valve body through the transmission mechanism. Thus, the valve body torque increases as the angular acceleration rate increases. A value obtained by subtracting the valve body torque from the motor torque corresponds to a torque consumed inside the transmission mechanism.

In this regard, in the configuration of the cooling system of the above aspect, the motor torque is calculated based on the effective voltage, and the valve body torque is calculated based on the angular acceleration rate of the motor. Then, the driving stress is calculated such that the calculated driving stress is larger when the difference between the calculated motor torque and valve body torque is larger. Therefore, for example, the driving stress when the effective voltage is high but the angular acceleration rate is not high is larger than that when the effective voltage is high and the angular acceleration rate is high. Thus, the stress that the gears are subjected to during driving of the motor can be calculated.

In the cooling system of the above aspect, the electronic control unit may be further configured to: (v) derive a base torque such that the derived base torque is larger when the effective voltage is higher; (vi) derive a correction factor such that the derived correction factor is larger when the effective voltage is higher as well as when a smoothed angular speed value that is a value obtained by smoothing the angular speed of the motor is smaller; and (vii) calculate the motor torque such that the calculated motor torque is larger when the product of the base torque and the correction factor is larger.

The base torque is derived as a torque that is generated by the motor when the effective voltage is applied to the motor in a situation where the angular speed of the motor is equal to a specified value. The base torque is larger when the effective voltage applied to the motor is higher.

The angular speed of the motor is likely to be larger when the effective voltage applied to the motor is higher. A deviation between the base torque and a torque being actually generated by the motor is likely to be wider when a gap between the current angular speed and the aforementioned specified value that is the angular speed used to derive the base torque is wider. For example, when the current angular speed is higher than the specified value, the motor torque decreases as the difference between the specified value and the current angular speed increases. It is therefore possible to calculate the motor torque by correcting the base torque with the deviation between the base torque and the torque being actually generated by the motor taken into account.

In the above configuration, the correction factor is derived such that the derived correction factor is larger when the effective voltage is higher, and that the derived correction factor is larger when the smoothed angular speed value is smaller. Since the smoothed angular speed value is a value reflecting the current angular speed, the correction factor can be set to a value according to the deviation between the base torque and the torque being actually generated by the motor. The motor torque is calculated based on the product of this correction factor and the base torque. It is therefore possible to calculate the motor torque with high accuracy when driving the valve body to shift by the motor.

The hardness of a constituent member of the control valve varies with the temperature of the constituent member. The hardness of the constituent member affects the magnitude of the stress that the gears are subjected to when the motor is driven to shift the valve body. In the cooling system of the above aspect, therefore, the electronic control unit may calculate the base torque based on the effective voltage and the temperature of a constituent member of the control valve or a value correlated with the temperature of the constituent member. As a result, the driving stress can be calculated with the temperature of the constituent member taken into account.

The torque input into the valve body through the transmission mechanism is likely to be larger when the gear ratio of the transmission mechanism is higher. In the cooling system of the above aspect, therefore, the electronic control unit may be configured to calculate the valve body torque such that the calculated valve body torque is larger when the gear ratio of the transmission mechanism is higher.

In the configuration of the cooling system of the above aspect, the electronic control unit may be configured to: (viii) calculate an index of the durability of the control valve; (ix) set the effective voltage lower when the durability of the control valve estimated from the index is lower; and (x) update the index based on the driving stress calculated during application of the effective voltage to the motor.

In the above configuration, the index is updated based on the driving stress. When the durability of the control valve estimated from this index is low, the effective voltage is less likely to assume a large value than when the durability is not low. In other words, when the durability has become low, the angular speed of the motor and the shift speed of the valve body when the motor is driven to shift the valve body are less likely to become high than when the durability has not become low. As a result, compared with when the durability has not become low, a load placed on the transmission mechanism during driving of the motor can be kept from increasing when the durability has become low. This results in a prolonged product life of the control valve.

When a period from start of application of an effective voltage to the motor until end of a shift of the valve body is referred to as a valve body shift period, the electronic control unit in the cooling system of the above aspect may be configured to: (xi) repeatedly calculate the driving stress during the valve body shift period, and when one valve body shift period has ended, select the largest value of a plurality of driving stresses calculated during that valve body shift period as a maximum value of the driving stress; and (xii) integrate a plurality of the maximum values of the driving stresses, and calculate the index such that the calculated index has a value indicating lower durability of the control valve when an integrated value is larger.

In the above configuration, the driving stress is repeatedly calculated during the valve body shift period, and when the valve body shift period has ended, a maximum value is selected from a plurality of calculated driving stresses. Then, the index is calculated so as to indicate lower durability of the control valve when the integrated value of the maximum value of the driving stress thus derived is larger. The effective voltage is less likely to assume a high value when the durability of the control valve indicated by this index is lower. Thus, compared with when the durability has not become low, a load placed on the transmission mechanism during driving of the motor can be kept from increasing when the durability has become low.

When a period from start of application of an effective voltage to the motor until end of a shift of the valve body is referred to as a valve body shift period, the electronic control unit in the cooling system of the above aspect may be configured to: (xiii) calculate the index such that the calculated index has a value indicating lower durability of the control valve when the number of times the plurality of the maximum values of the driving stresses have become equal to or larger than a criterion value is larger; or (xiv) obtain an average value of the driving stresses calculated during the one valve body shift period, and, by using the average value, calculate the index such that the calculated index has a value indicating low durability of the control valve; or (xv) integrate a plurality of differences, each difference of the plurality of differences being a value between the driving stress and the criterion value, to obtain an integrated value, and calculate the index such that the calculated index has a value indicating lower durability of the control valve when the integrated value is larger, when the driving stress is equal to or larger than the criterion value.

In the above configuration, the electronic control unit uses the index that has a value indicating lower durability of the control valve when the number of times the maximum value of the driving stress has become equal to or larger than the criterion value is larger; or uses the index obtained from an average value of driving stresses calculated during one valve body shift period; or, when the driving stress is equal to or larger than the criterion value, integrates the plurality of differences, each difference of the plurality of differences being a value between the driving stress and the criterion value, to obtain an integrated value, and uses the index that has a value indicating lower durability of the control valve when this integrated value is larger. Therefore, the effective voltage is less likely to assume a large value when the durability of the control valve indicated by the index is lower. Thus, compared with when the durability has not become low, a load placed on the transmission mechanism during driving of the motor can be kept from increasing when the durability has become low.

When the driving stress calculated as described above is small, the gears are not subjected to a large load during driving of the motor, so that, in reality, little stress builds up in the gears. In the cooling system of the above aspect, therefore, the electronic control unit may be configured to set the maximum value of the driving stress in the valve body shift period to zero when the maximum value in the valve body shift period is smaller than the criterion value.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
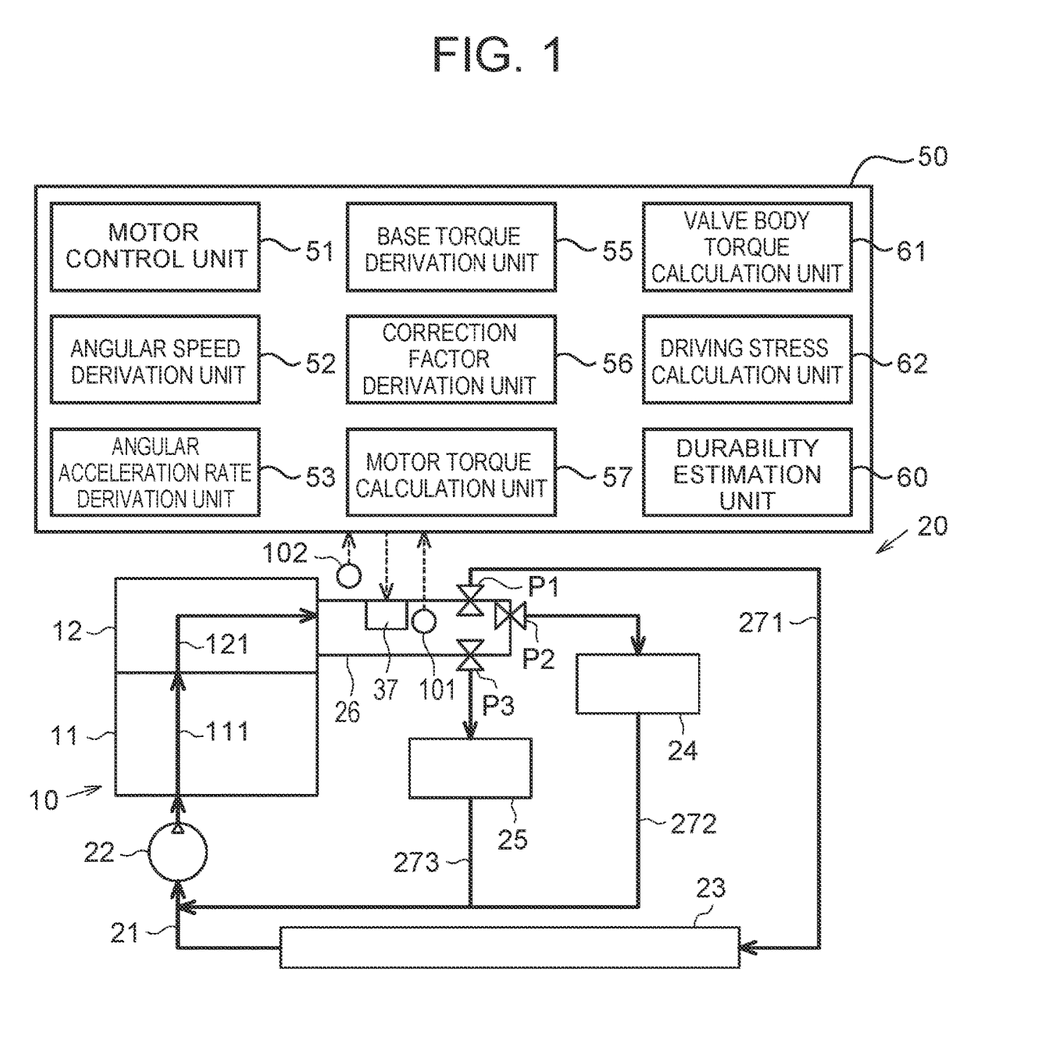
FIG. 1 is a view showing a schematic configuration of a cooling system of an internal combustion engine according to the present disclosure, and a functional configuration of an electronic control unit of the cooling system.

An embodiment of a cooling system of an internal combustion engine will be described below in accordance with FIG. 1 to FIG. 10. As shown in FIG. 1, a cooling system 20 includes a circulation circuit 21 through which circulates a coolant that flows through a water jacket 111 inside a cylinder block 11 and a water jacket 121 inside a cylinder head 12 of an internal combustion engine 10. In the circulation circuit 21, a pump 22 that discharges the coolant toward the water jacket 111 inside the cylinder block 11, a radiator 23 that cools the coolant, various devices 24 to be cooled, including a throttle valve and an EGR valve, and a heater core 25 of an air conditioner of the vehicle are provided.

In the circulation circuit 21, a control valve 26 into which the coolant having flowed out of the water jacket 121 inside the cylinder head 12 flows is provided. The control valve 26 includes three output ports P1, P2, P3 through which the coolant having flowed into the control valve 26 flows out. A radiator port P1 of the three output ports P1 to P3 is connected to a first coolant passage 271 through which the coolant flows via the radiator 23. The device port P2 of the three output ports P1 to P3 is connected to a second coolant passage 272 through which the coolant flows via the various devices 24. The heater port P3 of the three output ports P1 to P3 is connected to a third coolant passage 273 through which the coolant flows via the heater core 25.

Figure 2:
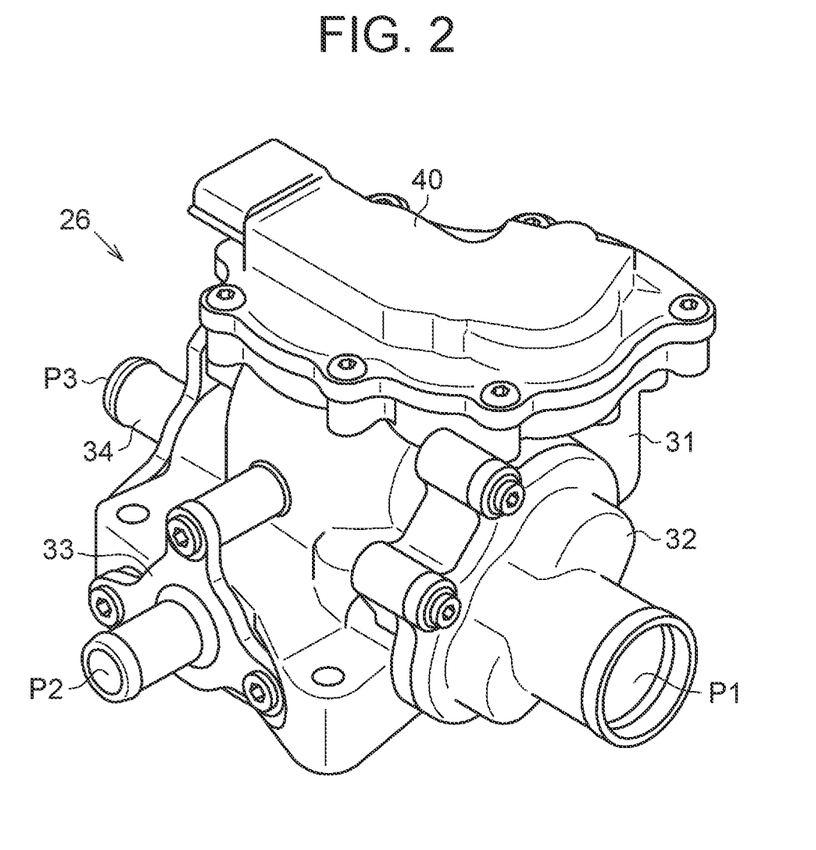
FIG. 2 is a perspective view showing a control valve of the cooling system.

As shown in FIG. 2, the control valve 26 includes a housing 31 that forms the framework of the control valve 26. The housing 31 includes a first connector member 32, a second connector member 33, and a third connector member 34 mounted thereon. The first connector member 32 includes the radiator port P1. The second connector member 33 includes the device port P2. The third connector member 34 includes the heater port P3. When the three connector members 32 to 34 are mounted on the housing 31, the output ports P1 to P3 are disposed at different positions.

Figure 3:
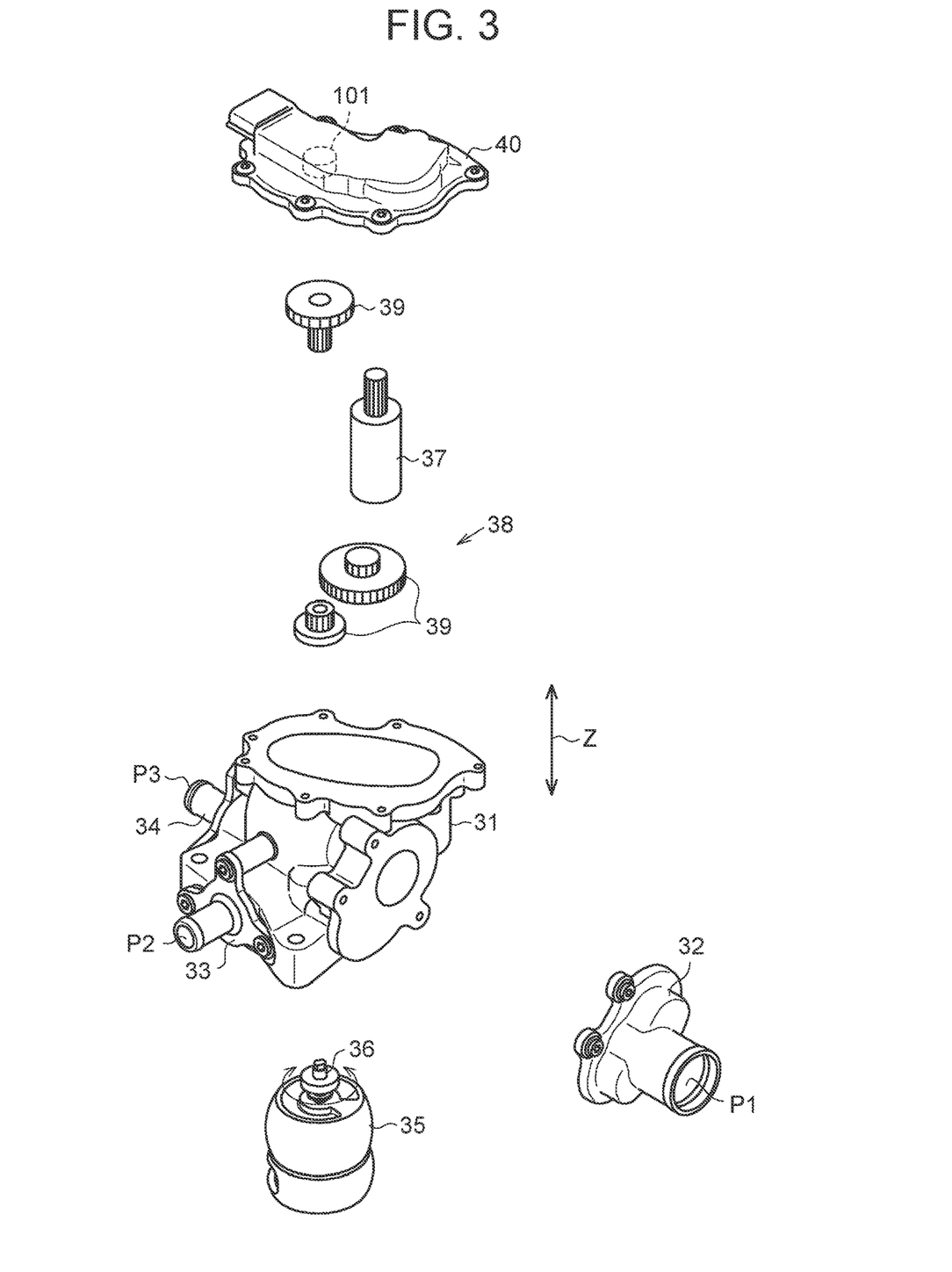
FIG. 3 is an exploded perspective view of the control valve.

As shown in FIG. 3, the control valve 26 includes a valve body 35 housed inside the housing 31. A coolant passage is formed in the valve body 35. A shaft 36 extending in an axial direction Z of the housing 31 is coupled to the valve body 35. The valve body 35 rotates (shifts) around the shaft 36 as indicated by the arrow in FIG. 3. As the valve body 35 rotates, an angle ANG of the valve body 35 relative to the housing 31 changes. This causes a change in the state of overlapping between the coolant passage formed in the valve body 35 and each of the output ports P1 to P3, which in turn causes a change in the flow rate of the coolant through each of the output ports P1 to P3. Thus, the flow of the coolant in the circulation circuit 21 can be controlled by rotating the valve body 35.

The control valve 26 includes a motor 37 and a transmission mechanism 38, both housed inside the housing 31. The transmission mechanism 38 transmits an output of the motor 37 to the shaft 36 of the valve body 35. Specifically, the transmission mechanism 38 includes a plurality of gears 39 that meshes with one another. In this embodiment, the gears 39 are made of synthetic resin. The valve body 35 rotates when torque output from the motor 37 is input into the shaft 36 through the gears 39.

A cover 40 is mounted on the housing 31 so as to cover a part in which the motor 37 and the transmission mechanism 38 are housed. Inside the cover 40, a rotation angle sensor 101 that detects the rotation angle of the motor 37 is provided.

Figure 4:
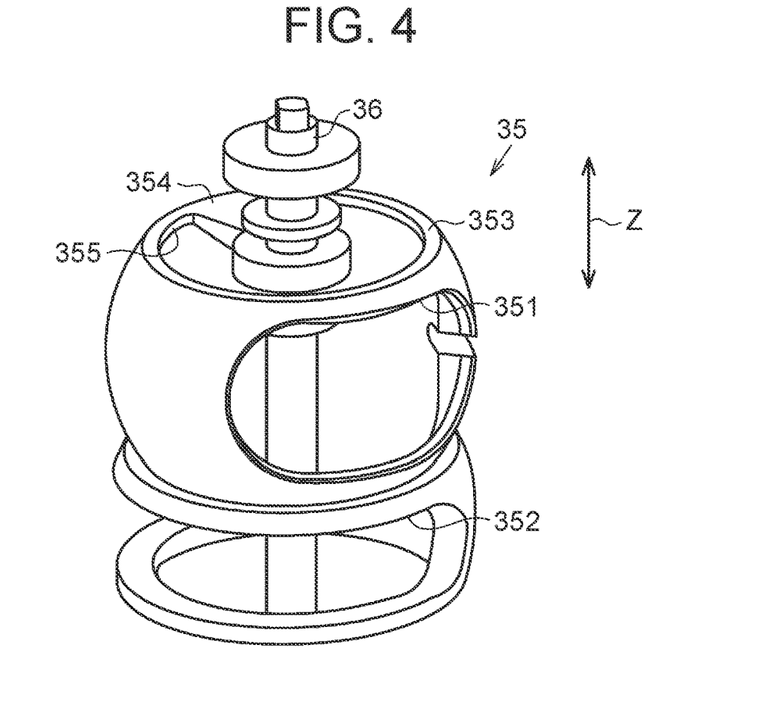
FIG. 4 is a perspective view showing a valve body of the control valve.

As shown in FIG. 4, the valve body 35 has a shape of two barrel-shaped bodies placed one on top of the other in the axial direction Z of the housing 31. Two holes 351, 352 aligned in the axial direction Z are formed in a side wall of the valve body 35. These holes 351, 352 form part of the coolant passage provided in the valve body 35. Of the two holes 351, 352, the first hole 351 located on the upper side in FIG. 4 communicates with the radiator port P1 when the angle of the valve body 35 relative to the housing 31 is within a certain range. While the first hole 351 communicates with the radiator port P1, the coolant having flowed into the control valve 26 flows out through the radiator port P1. Of the two holes 351, 352, the second hole 352, separate from the first hole 351, communicates with at least one of the device port P2 and the heater port P3 when the angle of the valve body 35 relative to the housing 31 is within another certain range. While the second hole 352 communicates with the device port P2, the coolant having flowed into the control valve 26 flows out through the device port P2. While the second hole 352 communicates with the heater port P3, the coolant having flowed into the control valve 26 flows out through the heater port P3.

When a wall of the valve body 35 on the upper side in FIG. 4 is referred to as an upper wall 353 of the valve body 35, the shaft 36 is connected to the upper wall 353. The upper wall 353 includes an arc-shaped groove 355 that extends so as to surround a root of the shaft 36 while leaving part of the upper wall 353 as an engaging portion 354.

Figure 5:
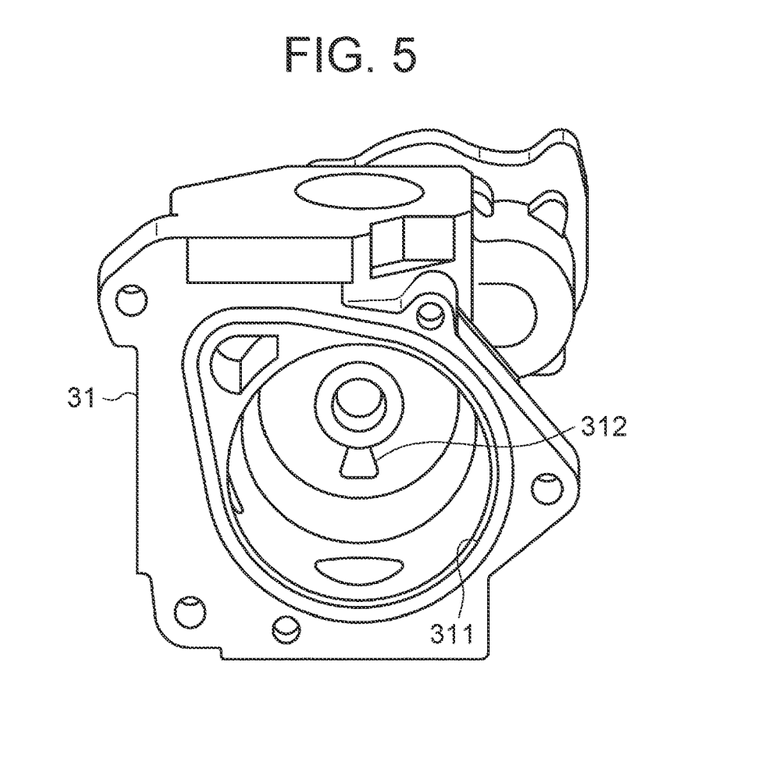
FIG. 5 is a perspective view showing a housing of the control valve.

FIG. 5 is a perspective view of the housing 31 as seen from an insertion direction of the valve body 35. To assemble the control valve 26, the valve body 35 is inserted into the housing 31 through a housing opening 311. A stopper 312 to be housed in the groove 355 is provided at a portion of the housing 31 that faces the upper wall 353 of the valve body 35. Thus, when the valve body 35 is housed inside the housing 31, the valve body 35 is restrained from rotating relative to the housing 31 as the engaging portion 354 of the valve body 35 comes into contact with the stopper 312. In other words, a range in which the engaging portion 354 does not come into contact with the stopper 312 is a range in which the valve body 35 is allowed to rotate relative to the housing 31.

The coolant flows into the housing 31 of the control valve 26 through the housing opening 311. Thus, the housing opening 311 functions as an input port of the control valve 26. The coolant having flowed into the housing 31 flows through the coolant passage provided in the valve body 35 and is guided to the output ports P1 to P3.

Figure 6:
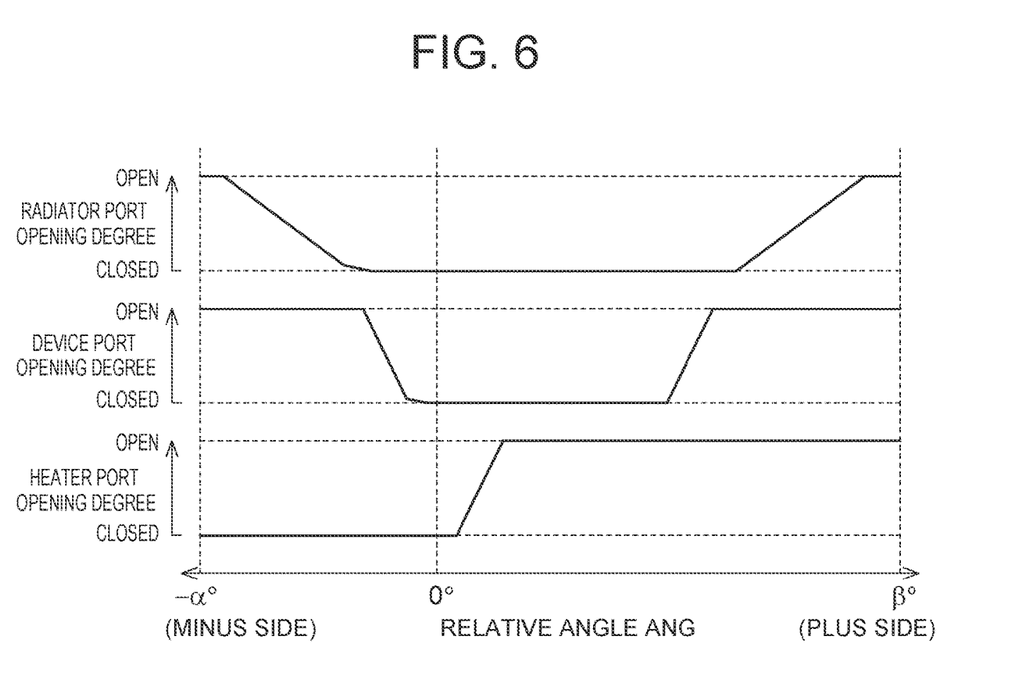
FIG. 6 is a graph showing a relation between an angle of the valve body relative to the housing and an opening degree of each port in the control valve.

FIG. 6 is a graph showing a relation between the angle ANG of the valve body 35 relative to the housing 31 and opening degrees of the respective output ports P1 to P3. In the control valve 26, when the relative angle ANG at which all the output ports P1 to P3 are closed is defined as 0°, the valve body 35 can be rotated relative to the housing 31, in both a plus direction and a minus direction, until the stopper 312 of the housing 31 and the engaging portion 354 of the valve body 35 come into contact with each other. The size and position of the holes 351, 352 of the valve body 35 are set such that the opening degrees of the output ports P1 to P3 change as shown in FIG. 6 as the relative angle ANG changes. In this embodiment, the angle ANG increases when the valve body 35 is rotated in the plus direction relative to the housing 31, and decreases when the valve body 35 is rotated in the minus direction relative to the housing 31.

In the control valve 26, when the valve body 35 is rotated in the plus direction from the position at which the relative angle ANG is 0°, the heater port P3 starts to open first, and the opening degree of the heater port P3 increases gradually as the relative angle ANG increases. When the relative angle ANG increases further after the heater port P3 is fully opened, the device port P2 opens next. The opening degree of the device port P2 increases as the relative angle ANG increases, and the radiator port P1 starts to open after the device port P2 is fully opened. The opening degree of the radiator port P1 also increases as the relative angle ANG increases. When a relative angle at which the engaging portion 354 and the stopper 312 come into contact with each other is defined as "−α°," the radiator port P1 is fully opened shortly before the valve body 35 reaches the position at which the relative angle ANG is −β°. Until the valve body 35 reaches the position at which the relative angle ANG is −β°, the output ports P1 to P3 are kept fully open even when the relative angle ANG increases.

On the other hand, when the valve body 35 is rotated in the minus direction from the position at which the relative angle ANG is 0°, the heater port P3 of the control valve 26 does not open. In this case, the device port P2 starts to open first, and the opening degree of the device port P2 increases gradually as the relative angle ANG decreases. When the relative angle ANG decreases further after the device port P2 is fully opened, the radiator port P1 opens. The opening degree of the radiator port P1 increases as the relative angle ANG decreases. When the relative angle at which the engaging portion 354 and the stopper 312 come into contact with each other is defined as "−α°," the radiator port P1 is fully opened shortly before the valve body 35 reaches the position at which the relative angle ANG is −α°. Until the valve body 35 reaches the position at which the relative angle ANG is −α°, the radiator port P1 and the device port P2 are kept fully open even when the relative angle ANG decreases.

Next, the configuration of control executed by the cooling system 20 will be described with reference to FIG. 1, FIG. 7, and FIG. 8. As shown in FIG. 1, detection signals from various sensors including the rotation angle sensor 101 of the control valve 26 and a coolant temperature sensor 102 are input into an electronic control unit 50 of the cooling system 20. The rotation angle sensor 101 outputs a signal according to a rotation angle θ of an output shaft of the motor 37 as a detection signal. The coolant temperature sensor 102 detects an outlet coolant temperature Twt that is the temperature of the coolant having flowed out of the cylinder head 12, and outputs a signal according to the outlet coolant temperature Twt as a detection signal.

When the control valve 26 is used for an extended period of time, the durability of the control valve 26 decreases gradually. When the motor 37 is driven to rotate the valve body 35, the valve body 35 may be slow to start rotating after output torque of the motor 37 is input into the valve body 35, or a gap may occur between an actual rotation speed (shift speed) of the valve body 35 and a rotation speed (shift speed) of the valve body 35 that is commensurate with the output torque of the motor 37. In such cases, the output torque of the motor 37 is consumed as a force that presses the gears 39 inside the transmission mechanism 38, which can cause stress build-up in the gears 39. If stress thus builds up in the gears 39, the durability of the control valve 26 will decrease gradually. In this embodiment, therefore, the electronic control unit 50 calculates a driving stress STRdr that is a stress that the gears 39 are subjected to when the motor 37 is driven to rotate the valve body 35. Then, the electronic control unit 50 estimates the durability of the control valve 26 based on the calculated driving stress STRdr, and reflects the estimation result of the durability in controlling the motor 37.

As functional units that realize control of the motor 37 with the durability of the control valve 26 taken into account, the electronic control unit 50 includes a motor control unit 51, an angular speed derivation unit 52, an angular acceleration rate derivation unit 53, a base torque derivation unit 55, a correction factor derivation unit 56, a motor torque calculation unit 57, a valve body torque calculation unit 61, a driving stress calculation unit 62, and a durability estimation unit 60.

The motor control unit 51 controls the driving of the motor 37. Specifically, the motor control unit 51 determines a duty ratio DT of a voltage signal input into the motor 37. Then, the motor control unit 51 generates a voltage signal of the determined duty ratio DT and inputs the voltage signal into the motor 37. How this duty ratio DT is determined will be described in detail later.

The angular speed derivation unit 52 derives an angular speed ω of the output shaft of the motor 37 during each predetermined control cycle. Specifically, the angular speed derivation unit 52 derives the angular speed ω of the motor 37 by differentiating, with respect to time, the rotation angle θ of the motor 37 that has been derived based on the detection signal of the rotation angle sensor 101.

The angular acceleration rate derivation unit 53 derives an angular acceleration rate Dω of the motor 37 as an amount of change in angular speed ω of the motor 37. Specifically, the angular acceleration rate derivation unit 53 derives the angular acceleration rate Dω by differentiating, with respect to time, the angular speed ω that has been derived by the angular speed derivation unit 52. When the angular speed ω is increasing, the angular acceleration rate Dω has a positive value, and when the angular speed ω is decreasing, the angular acceleration rate Dω has a negative value.

The base torque derivation unit 55 derives a base torque TQB based on the duty ratio DT of the voltage signal and the outlet coolant temperature Twt. The base torque TQB refers to torque generated by the motor 37 when a voltage signal is input into the motor 37 in a situation where the angular speed ω of the motor 37 is equal to a specified value (e.g., zero). As described above, the coolant having flowed out of the cylinder head 12 flows into the control valve 26. Therefore, the temperature of a constituent member of the control valve 26 is correlated with the outlet coolant temperature Twt. Thus, the base torque TQB is a value derived based on the duty ratio DT of the voltage signal and a value correlated with the temperature of the constituent member of the control valve 26. Examples of the constituent member of the control valve 26 include the gears 39 of the transmission mechanism 38, the valve body 35, and a seal ring (not shown).

Figure 7:
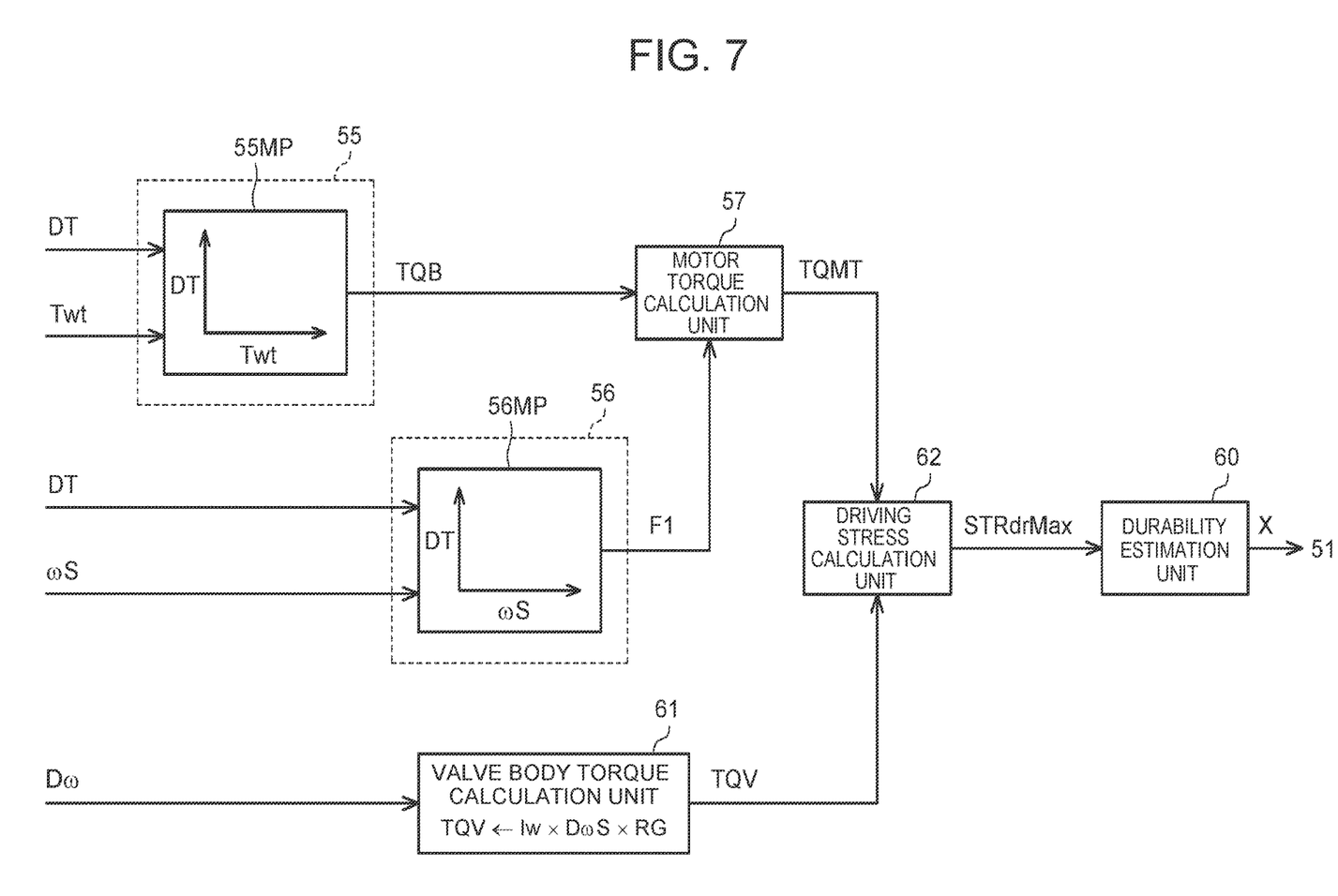
FIG. 7 is a block diagram showing the functional configuration of the electronic control unit.

As shown in FIG. 7, the base torque derivation unit 55 stores a base torque derivation map 55MP that is used to derive the base torque TQB based on the relation between the duty ratio DT of the voltage signal and the outlet coolant temperature Twt. The base torque derivation unit 55 derives the base torque TQB by using the base torque derivation map 55MP.

The base torque TQB is likely to be larger when the effective voltage applied to the motor 37 is higher. The effective voltage is higher when the duty ratio DT of the voltage signal is higher. Therefore, the base torque derivation map 55MP is created such that the base torque TQB has a larger value when the duty ratio DT of the voltage signal is higher.

The hardness of the constituent member of the control valve 26 varies with the temperature of the constituent member. The hardness of the constituent member affects the ease with which the valve body 35 is rotated when the effective voltage is applied to the motor 37 to rotate the valve body 35. Depending on whether or not the valve body 35 is easy to rotate, the gears 39 are subjected to different magnitudes of stress when the effective voltage is applied to the motor 37 to rotate the valve body 35. Therefore, the base torque derivation map 55MP is created such that the base torque TQB varies with the outlet coolant temperature Twt correlated with the temperature of the constituent member.

The correction factor derivation unit 56 calculates a correction factor F1 based on the duty ratio DT of the voltage signal and a smoothed angular speed value ωS that is a value obtained by smoothing the angular speed ω by a moving-average process. The correction factor F1 is a factor with which the base torque TQB is corrected to obtain the motor torque TQMT. The smoothed angular speed value ωS is calculated based on a plurality of angular speeds w that has been consecutively derived. The angular speeds ω used to calculate the smoothed angular speed value ωS include the newest value ω(N) of the angular speed.

As shown in FIG. 7, the correction factor derivation unit 56 stores a correction factor derivation map 56MP that is used to derive the correction factor F1 based on the duty ratio DT of the voltage signal and the smoothed angular speed value ωS. The correction factor derivation unit 56 derives the correction factor F1 by using the correction factor derivation map 56MP.

As will be described in detail later, the correction factor F1 is a factor used to calculate the motor torque TQMT that is torque generated by the motor 37. The motor torque TQMT has a larger value when the correction factor F1 is larger. The motor torque TQMT is larger when the effective voltage applied to the motor 37 is higher. The effective voltage is higher when the duty ratio DT of the voltage signal is higher. Therefore, the correction factor derivation map 56MP is created such that the correction factor F1 is larger when the duty ratio DT of the voltage signal is higher.

A deviation between the base torque TQB and the torque being actually generated by the motor 37 is likely to be wider when a gap between the current angular speed ω and the aforementioned specified value that is the angular speed used to derive the base torque TQB is wider. For example, when the current angular speed ω is higher than the specified value, the motor torque TQMT decreases as the difference between the specified value and the current angular speed ω increases. The smoothed angular speed value ωS is correlated with the current angular speed ω. Thus, if the correction factor F1 is set smaller when the difference between the specified value and the smoothed angular speed value ωS is larger, the motor torque TQMT can be made smaller when the difference between the specified value and the current angular speed ω is larger. Therefore, the correction factor derivation map 56MP is created such that the correction factor F1 is larger when the smoothed angular speed value ωS is smaller.

The motor torque calculation unit 57 calculates, as the motor torque TQMT, the product of the base torque TQB calculated by the base torque derivation unit 55 and the correction factor F1 calculated by the correction factor derivation unit 56. Specifically, the motor torque TQMT is larger when the product of the base torque TQB and the correction factor F1 is larger. The duty ratio DT of the voltage signal input into the motor 37 is a value correlated with the effective voltage applied to the motor 37. Therefore, it can be said that the motor torque TQMT is a value according to the effective voltage.

The valve body torque calculation unit 61 calculates the valve body torque TQV that is part of the motor torque TQMT and that has been converted into rotation of the valve body 35, such that the calculated valve body torque TQV is larger when the angular acceleration rate Dω of the motor 37 is higher. Specifically, as shown in FIG. 7, the valve body torque calculation unit 61 calculates the valve body torque TQV as the product of a smoothed angular acceleration rate DωS that is a value obtained by smoothing the angular acceleration rate Dω by a moving-average process, an inertia Iw of the motor 37, and a gear ratio RG of the transmission mechanism 38. Therefore, the valve body torque TQV is larger when the inertia Iw is larger as well as when the gear ratio RG is higher. The inertia Iw and the gear ratio RG are values determined by the specifications of the control valve 26.

The driving stress calculation unit 62 calculates the driving stress STRdr based on the motor torque TQMT calculated by the motor torque calculation unit 57 and the valve body torque TQV calculated by the valve body torque calculation unit 61.

Figure 8:
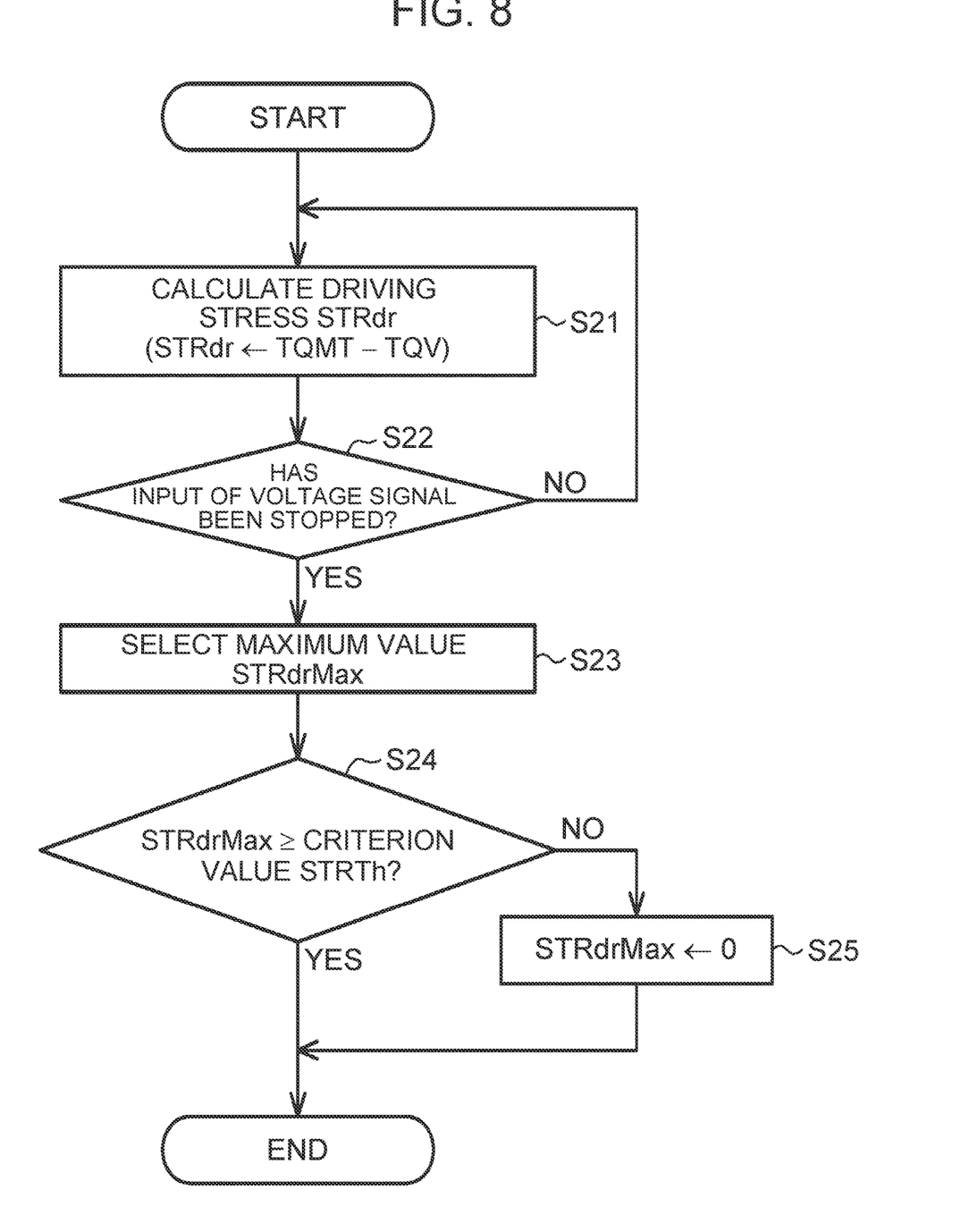
FIG. 8 is a flowchart showing a processing routine executed to derive a maximum value of a driving stress during a valve body shift period of the control valve.

Referring to FIG. 8, a processing routine executed by the driving stress calculation unit 62 to calculate the driving stress STRdr will be described. Execution of this processing routine is started when input of a voltage signal into the motor 37 is started.

In step S21 of this processing routine, the driving stress STRdr is calculated as the difference between the motor torque TQMT and the valve body torque TQV. The driving stress STRdr calculated here has a larger value when the difference between the motor torque TQMT and the valve body torque TQV is larger. Then, in the next step S22, it is determined whether or not input of the voltage signal into the motor 37 has been stopped. When the voltage signal is still being input into the motor 37 (S22: NO), the process flow moves to step S21. This means that the driving stress STRdr is repeatedly calculated while input of the voltage signal into the motor 37 continues and the valve body 35 rotates.

On the other hand, when input of the voltage signal into the motor 37 has been stopped (S22: YES), rotation of the valve body 35 is stopped, and the process flow moves to the next step S23. In step S23, the largest value of the driving stresses STRdr calculated during one valve body shift period TMV is selected as the maximum value STRdrMax. The valve body shift period TMV here refers to a period from start of application of the effective voltage to the motor 37 until end of rotation of the valve body 35.

In the next step S24, it is determined whether or not the maximum value STRdrMax of the driving stress in the current valve body shift period TMV is equal to or larger than a criterion value STRTh. The criterion value STRTh will be described later. When the maximum value STRdrMax is equal to or larger than the criterion value STRTh (S24: YES), the current processing routine is ended. On the other hand, when the maximum value STRdrMax is smaller than the criterion value STRTh (S24: NO), the process flow moves to the next step S25. In step S25, the maximum value STRdrMax is set to zero. Thereafter, the current processing routine is ended.

As shown in FIG. 7, the durability estimation unit 60 calculates an index X indicating the durability of the control valve 26, by using the maximum value STRdrMax of the driving stress in the valve body shift period TMV selected by the driving stress calculation unit 62. Specifically, when the maximum value STRdrMax is derived by the driving stress calculation unit 62, i.e., when the processing routine shown in FIG. 8 is ended, the durability estimation unit 60 performs a process of integrating the maximum value STRdrMax. When an integrated value ΣSTRdr of the maximum value STRdrMax calculated by the integration process is larger, it can be inferred that a larger amount of damage remains in the gears 39 and that the durability of the control valve 26 has become lower. Therefore, the durability estimation unit 60 calculates the index X such that the calculated index X has a larger value when the integrated value ΣSTRdr is larger. This means that the index X increases as the durability of the control valve 26 decreases.

The motor control unit 51 determines an upper limit DTul and a lower limit DTll of the duty ratio of the voltage signal based on the index X calculated by the durability estimation unit 60. In this case, the motor control unit 51 determines the upper limit DTul and the lower limit DTll such that the absolute values of the determined upper limit DTul and lower limit DTll are smaller when the index X is larger.

Moreover, the motor control unit 51 calculates a calculated duty ratio DTC that is a calculated value of the duty ratio of the voltage signal input into the motor 37, by performing feedback control that uses, as an input, a deviation between the rotation angle θ of the motor 37 and a target rotation angle θTr that is a target for the rotation angle of the motor 37. Then, the motor control unit 51 determines the duty ratio DT of the voltage signal based on the calculated duty ratio DTC and the upper and lower limits DTul, DTll. Specifically, when the calculated duty ratio DTC is not higher than the upper limit DTul nor lower than the lower limit DTll, the motor torque calculation unit 57 sets the duty ratio DT of the voltage signal to a value equal to the calculated duty ratio DTC. When the calculated duty ratio DTC is higher than the upper limit DTul, the motor torque calculation unit 57 sets the duty ratio DT of the voltage signal to a value equal to the upper limit DTul. When the calculated duty ratio DTC is lower than the lower limit DTll, the motor torque calculation unit 57 sets the duty ratio DT of the voltage signal to a value equal to the lower limit DTll.

The effective voltage applied to the motor 37 can be calculated based on the duty ratio DT of the voltage signal input into the motor 37 and the power source voltage of the motor 37. Therefore, it can be said that the motor control unit 51 applies to the motor 37 the effective voltage according to the deviation between the target rotation angle θTr and the rotation angle θ.

Figure 9:
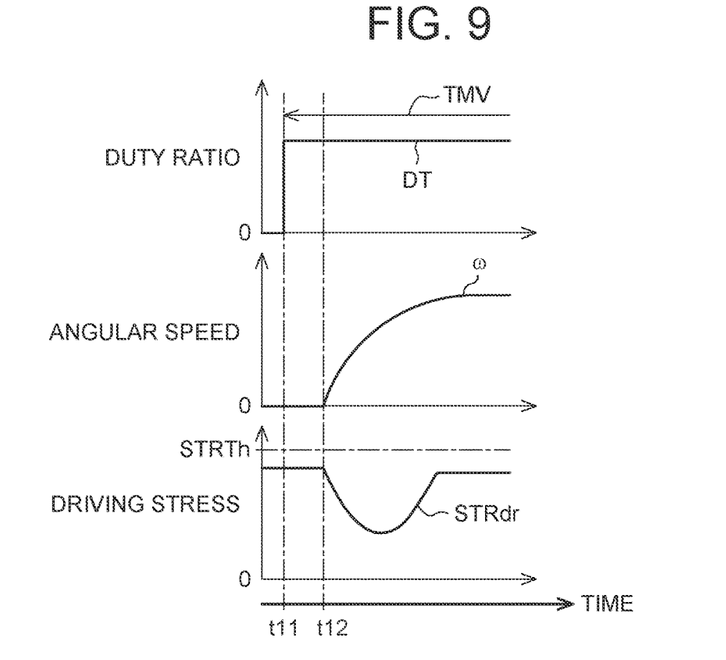
FIG. 9 is a timing chart showing how a duty ratio of a voltage signal, an angular speed of the motor, and a calculated driving stress change when the valve body promptly starts to rotate after the voltage signal is input into the motor of the control valve.
Figure 10:
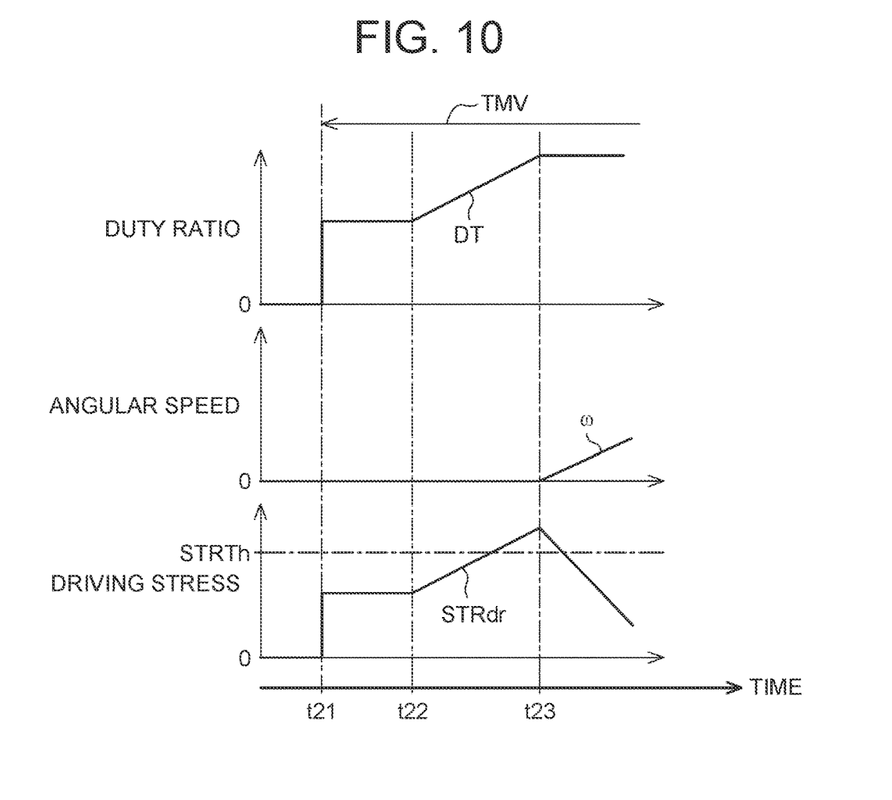
FIG. 10 is a timing chart showing how the duty ratio of the voltage signal, the angular speed of the motor, and the calculated driving stress change when the valve body is slow to start rotating after the voltage signal is input into the motor.

Referring to FIG. 9 and FIG. 10, how to set the criterion value STRTh shown in FIG. 8 will be described. FIG. 9 shows an example of a case where the valve body 35 promptly starts to rotate after the effective voltage is applied to the motor 37. FIG. 10 shows a case where the valve body 35 is slow to start rotating after the effective voltage is applied to the motor 37, for example, due to a foreign object being caught in the control valve 26.

In the example shown in FIG. 9, the voltage signal is input into the motor 37, i.e., application of the effective voltage to the motor 37 is started, at timing t11. Then, the valve body 35 starts to rotate at timing t12 later than the timing t11. The period from the timing t11 to the timing t12 corresponds to a response delay period that is a period from start of application of the effective voltage to the motor 37 until start of rotation of the valve body 35. During this period, the angular speed ω of the motor 37 remains zero, so that the angular acceleration rate Dω of the motor 37 is held at zero. Therefore, the driving stress STRdr calculated in step S21 of the processing routine shown in FIG. 8 assumes a value equal to the base torque TQB. This is because the valve body torque TQV is zero when the angular acceleration rate Dω is zero.

After the timing t12 has passed, the valve body 35 starts to rotate. This means that the angular speed ω increases after the timing t12. As a result, the angular acceleration rate Dω becomes higher than zero. Then, the valve body torque TQV becomes larger than zero, so that the driving stress STRdr calculated in step S21 decreases as the valve body torque TQV increases.

When the angular acceleration rate Dω starts to decrease after the timing t12, the valve body torque TQV also decreases. Therefore, the driving stress STRdr calculated in step S21 increases as the angular acceleration rate Dω decreases. However, the driving stress STRdr does not become larger than the base torque TQB.

As shown in FIG. 9, the criterion value STRTh is set to a value larger than the maximum value STRdrMax of the driving stress in the case where the valve body 35 can thus promptly start to rotate. This is because when the valve body 35 promptly starts to rotate after the effective voltage is applied to the motor 37, little torque is consumed inside the transmission mechanism 38 and the gears 39 are not subjected to a large load. When the gears 39 are not subjected to a large load, little stress builds up in the gears 39 when the motor 37 is driven to rotate the valve body 35. In this case, therefore, a "NO" determination is made in step S24 of the processing routine shown in FIG. 8, and the maximum value STRdrMax in the valve body shift period TMV is set to zero (S25).

In the example shown in FIG. 10, the voltage signal is input into the motor 37, i.e., application of the effective voltage to the motor 37 is started, at timing t21. When a foreign object is caught in the control valve 26, the valve body 35 is slow to start rotating after the output torque of the motor 37 starts to be transmitted to the valve body 35. Therefore, the calculated duty ratio DTC is increased by feedback control from timing t22. As a result, the duty ratio DT of the voltage signal input into the motor 37 increases from the timing t22. The length of the period from the timing t21 to the timing t22 is longer than the length of the period from the timing t11 to the timing t12 shown in FIG. 9.

When the valve body 35 is thus slow to start rotating, the driving stress STRdr calculated in step S21 of the processing routine shown in FIG. 8 assumes a value equal to the base torque TQB. The base torque TQB is larger when the duty ratio DT is higher. Therefore, when the timing t22 has passed, the driving stress STRdr calculated in step S21 increases as the duty ratio DT increases.

The valve body 35 starts to rotate at timing t23. Then, the angular speed ω increases. As a result, the angular acceleration rate Dω becomes higher than zero, so that the valve body torque TQV becomes larger than zero. In the example shown in FIG. 10, the duty ratio DT does not increase after the timing t23. This means that the base torque TQB does not increase. Therefore, the driving stress STRdr calculated in step S21 decreases as the valve body torque TQV increases. Thus, the maximum value STRdrMax of the driving stress selected in step S23 of the processing routine shown in FIG. 8 is the value at the timing t23.

As shown in FIG. 10, the criterion value STRTh is set to a value smaller than the maximum value STRdrMax of the driving stress in the case where the valve body 35 is slow to start rotating due to a foreign object being caught in the control valve 26 etc. This is because in such a case, the valve body 35 takes a long period of time to start rotating after torque is output from the motor 37. The gears 39 are likely to be subjected to a larger load when the valve body 35 takes a longer period of time to start rotating during the valve body shift period TMV. Stress is more likely to build up in the gears 39 when the gears 39 are subjected to a larger load. In such a case, therefore, a "YES" determination is made in step S24 of the processing routine shown in FIG. 8, so that the maximum value STRdrMax in the valve body shift period TMV is set to a value larger than zero.

The workings and effects of this embodiment will be described. When the target rotation angle θTr is changed and a gap occurs between the rotation angle θ of the motor 37 and the target rotation angle θTr, the motor 37 starts to be driven. Specifically, the calculated duty ratio DTC is calculated by feedback control that uses the deviation between the target rotation angle θTr and the rotation angle θ as an input, and the duty ratio DT of the voltage signal is determined based on the calculated duty ratio DTC. The effective voltage based on the determined duty ratio DT and the power source voltage of the motor 37 is applied to the motor 37. Then, the motor 37 is driven to rotate the valve body 35, so that the gap between the target rotation angle θTr and the rotation angle θ narrows.

When the effective voltage is thus applied to the motor 37, the valve body shift period TMV starts. Then, the driving stress STRdr is repeatedly calculated. Specifically, the motor torque TQMT is calculated by the motor torque calculation unit 57, and the valve body torque TQV is calculated by the valve body torque calculation unit 61. In the driving stress calculation unit 62, the difference between the motor torque TQMT and the valve body torque TQV is calculated as the driving stress STRdr.

The motor torque TQMT is equal to the product of the base torque TQB derived by the base torque derivation unit 55 and the correction factor F1 derived by the correction factor derivation unit 56. The base torque TQB is a value derived based on the duty ratio DT of the voltage signal input into the motor 37 and the outlet coolant temperature Twt. The duty ratio DT is a value correlated with the effective voltage applied to the motor 37, and the outlet coolant temperature Twt is a value correlated with the hardness of the gears 39 disposed on the torque transmission path from the motor 37 to the valve body 35. It is therefore possible to set the base torque TQB to a value according to the effective voltage and the hardness of the gears 39 at that time by deriving the base torque TQB based on the duty ratio DT and the outlet coolant temperature Twt.

The correction factor F1 is derived based on the duty ratio DT of the voltage signal and the smoothed angular speed value ωS. The duty ratio DT is a value correlated with the effective voltage applied to the motor 37. It is therefore possible to set the correction factor F1 to a value according to the effective voltage at that time and the angular speed ω at the time of calculation of the correction factor F1, by deriving the correction factor F1 based on the duty ratio DT and the smoothed angular speed value ωS.

Since the motor torque TQMT is calculated based on such base torque TQB and correction factor F1, the motor torque TQMT can be calculated with high accuracy. The valve body torque TQV is derived based on the smoothed angular acceleration rate DωS of the motor 37 and the gear ratio RG of the transmission mechanism 38. There is a correlation between the rotation speed of the valve body 35 and the angular speed ω of the motor 37: The higher the angular acceleration rate Dω of the motor 37, the larger the amount of increase in rotation speed of the valve body 35. A large amount of increase in rotation speed of the valve body 35 means that a large torque has been input from the motor 37 into the valve body 35 through the transmission mechanism 38. In this embodiment, therefore, the valve body torque TQV has a larger value when the angular acceleration rate Dω is higher. Moreover, the torque input into the valve body 35 through the transmission mechanism 38 is larger when the gear ratio RG of the transmission mechanism 38 is higher. In this embodiment, therefore, the valve body torque TQV has a larger value when the gear ratio RG is higher.

The difference between the motor torque TQMT and the valve body torque TQV thus calculated is calculated as the driving stress STRdr. This means that the driving stress STRdr is larger when the difference between the motor torque TQMT and the valve body torque TQV is larger. Therefore, for example, the driving stress STRdr when the effective voltage is high but the angular acceleration rate Dω is not so high is larger than that when the effective voltage is high and the angular acceleration rate Dω is high. Thus, the stress that the gears 39 are subjected to during driving of the motor 37 can be calculated.

In this embodiment, the driving stress STRdr is repeatedly calculated during one valve body shift period TMV. When input of the voltage signal into the motor 37 is stopped and the valve body shift period TMV ends, the largest value of the driving stresses STRdr calculated during that valve body shift period TMV is selected as the maximum value STRdrMax of the driving stress.

The durability estimation unit 60 estimates the durability of the control valve 26 based on the maximum value STRdrMax of the driving stress selected by the driving stress calculation unit 62. Specifically, each time the maximum value STRdrMax is selected by the driving stress calculation unit 62, the durability estimation unit 60 integrates the maximum value STRdrMax. When the integrated value ΣSTRdr of the maximum value is larger, it can be inferred that a larger amount of damage has built up in the gears 39. As the amount of damage increases, the durability of the control valve 26 decreases. In this embodiment, the index X is calculated based on the integrated value ΣSTRdr.

The index X has a larger value when the durability of the control valve 26 is estimated to have become lower.

When the index X is thus calculated, the upper limit DTul and the lower limit DTll of the duty ratio are calculated based on the index X. The absolute value of the upper limit DTul and the absolute value of the lower limit DTll are smaller when the index X is larger and the durability of the control valve 26 is lower. The duty ratio DT of the voltage signal input into the motor 37 is determined such that the determined duty ratio DT has a value between the upper limit DTul and the lower limit DTll. Therefore, when the durability of the control valve 26 is lower, the rotation speed of the valve body 35 is less likely to be high when the valve body 35 is rotated. The load placed on the transmission mechanism 38 is less likely to become large when the effective voltage applied to the motor 37 is lower and the rotation speed of the valve body 35 is lower.

Thus varying the upper limit of the rotation speed of the valve body 35 according to the durability of the control valve 26 can prolong the product life of the control valve 26. This embodiment can further produce the following effects.

When the valve body 35 promptly starts to rotate after the effective voltage is applied to the motor 37 as shown in FIG. 9, the driving stress STRdr does not become very large during the valve body shift period TMV of that time. In this case, driving the motor 37 does not subject the transmission mechanism 38 to a very large load attributable to the driving of the motor 37. Thus, it can be inferred that driving the motor 37 will cause little stress build-up in the gears 39 and will not leave a large amount of damage in the gears 39. In such a case, therefore, the maximum value STRdrMax of the driving stress is smaller than the criterion value STRTh, and the maximum value STRdrMax is set to zero. This can prevent the electronic control unit 50 from updating the index X when it is inferred that driving the motor 37 will not leave a large amount of damage in the gears 39. As a result, the electronic control unit 50 can be prevented from evaluating the durability of the control valve 26 to be excessively low.

The above-described embodiment can be implemented with the following changes made thereto. The embodiment and the following modified examples can be implemented in combination to such an extent that no technical inconsistency arises.

In the above embodiment, the index X is calculated such that the calculated index X has a larger value when the integrated value STRdr of the maximum value of the driving stress is larger. A parameter other than the integrated value STRdr may be used to calculate the index X, as long as the index X can be updated based on the driving stress STRdr. It can be inferred that the durability of the control valve 26 is lower when the number of times the maximum value STRdrMax has become equal to or larger than the criterion value is larger. Therefore, for example, the index X may be calculated such that the calculated index X has a larger value to indicate lower durability of the control valve 26, when the number of times the maximum value STRdrMax has become equal to or larger than the criterion value STRTh is larger.

An average value of a plurality of driving stresses STRdr calculated during one valve body shift period TMV may be obtained, and this average value may be used to calculate the index X so as to indicate low durability of the control valve 26. When the driving stress STRdr is equal to or larger than the criterion value STRTh, the difference between the driving stress STRdr and the criterion value STRTh may be integrated. Then, the index X may be updated such that the updated index X has a larger value to indicate lower durability of the control valve 26 when the integrated value is larger.

It is not necessary to reflect the durability of the control valve 26 estimated from the index X in controlling the motor 37. For example, when the maximum value STRdrMax of the driving stress has become equal to or larger than the criterion value STRTh, this event may be stored as a history in a memory of the electronic control unit 50. If such a history is stored in the memory, a worker will be able to check during maintenance of the cooling system 20 whether or not the gears 39 have been subjected to a stress large enough to remain as damage in the control valve 26.

It is not necessary to set the maximum value STRdrMax to zero when the maximum value STRdrMax of the driving stress is smaller than the criterion value STRTh.

There is a time lag between start of application of the effective voltage to the motor 37 and start of actual rotation of the valve body 35. Therefore, calculation of the driving stress STRdr may be started after a time corresponding to this time lag has elapsed since the start of application of the effective voltage to the motor 37. Thus, a calculation period that is a period during which the driving stress STRdr is repeatedly calculated need not include the timing at which application of the effective voltage to the motor 37 is started, as long as this calculation period includes the timing at which the valve body 35 starts to rotate after the effective voltage is applied to the motor 37. In this case, the largest value of the driving stresses STRdr calculated during the calculation period is selected as the maximum value STRdrMax. Then, the maximum value STRdrMax of the driving stress in the calculation period is integrated. The durability of the control valve 26 estimated from this integrated value STRdr may be reflected in controlling the motor 37.

The upper limit DTul and the lower limit DTll of the duty ratio need not be varied based on the index X as in the above embodiment, as long as the durability of the control valve 26 estimated from the index X can be reflected in controlling the motor 37. For example, to determine the duty ratio DT of the voltage signal, the product of the calculated duty ratio DTC and a duty ratio correction factor according to the index X may be used as the duty ratio DT. In this case, it is preferable that the duty ratio correction factor be smaller when the index X is larger and the durability of the control valve 26 is lower. Thus, when the durability of the control valve 26 is lower, the duty ratio DT of the voltage signal input into the motor 37 is less likely to become high, i.e., the effective voltage applied to the motor 37 is less likely to become high. As a result, the product life of the control valve 26 can be prolonged.

In the above embodiment, the outlet coolant temperature Twt is used as the value correlated with the temperature of the constituent member of the control valve 26 to derive the base torque TQB. In the case where a sensor that detects the temperature of the constituent member of the control valve 26 is provided, the temperature of the constituent member detected by this sensor may be used instead of the outlet coolant temperature Twt to derive the base torque TQB.

If changes in base torque TQB attributable to changes in temperature of the constituent member of the control valve 26 do not much affect the calculation of the driving stress STRdr, the base torque TQB may be derived without using the temperature of the constituent member or the value correlated with the temperature of the constituent member.

A value obtained by multiplying the product of the base torque TQB and the correction factor F1 by a predetermined gain may be used as the motor torque TQMT. Also in this case, the value of the motor torque TQMT can be made larger as the product of the base torque TQB and the correction factor F1 becomes larger.

A control valve with a configuration different from that of the control valve 26 may be used, as long as that valve is configured to be able to change the flow of the coolant in the circulation circuit 21 by the valve body shifting inside the housing. For example, a control valve configured to be able to change the flow of the coolant in the circulation circuit 21 by the valve body sliding inside the housing may be used.

What is claimed is:

1. A cooling system of an internal combustion engine, the cooling system comprising:
   a control valve provided in a circulation circuit of a coolant flowing inside the internal combustion engine, the control valve including a housing, a valve body that shifts inside the housing, a motor, and a transmission mechanism that includes a plurality of gears meshing with one another and transmits an output of the motor to the valve body, the control valve being configured to control flow of the coolant in the circulation circuit by driving the motor so as to shift the valve body; and
   an electronic control unit configured to have the following functions:
   controlling driving of the motor;
   calculating a motor torque that is a torque generated by the motor, based on an effective voltage applied to the motor;
   calculating a valve body torque that is part of the motor torque and that has been converted into a shift of the valve body, such that the calculated valve body torque is larger when an angular acceleration rate of the motor is higher; and
   calculating a driving stress that is a stress that the gears are subjected to when the motor is driven to shift the valve body, such that the calculated driving stress is larger when a difference between the motor torque and the valve body torque is larger.

2. The cooling system according to claim 1, wherein the electronic control unit is further configured to:
   derive a base torque such that the derived base torque is larger when the effective voltage is higher;
   derive a correction factor such that the derived correction factor is larger when the effective voltage is higher as well as when a smoothed angular speed value that is a value obtained by smoothing an angular speed of the motor is smaller; and
   calculate the motor torque such that the calculated motor torque is larger when a product of the base torque and the correction factor is larger.

3. The cooling system according to claim 2, wherein the electronic control unit is configured to calculate the base torque based on the effective voltage and temperature of a constituent member of the control valve or a value correlated with the temperature of the constituent member.

4. The cooling system according to claim 1, wherein the electronic control unit is configured to calculate the valve body torque such that the calculated valve body torque is larger when a gear ratio of the transmission mechanism is higher.

5. The cooling system according to claim 1, wherein the electronic control unit is further configured to:
   calculate an index of durability of the control valve;
   set the effective voltage lower when the durability of the control valve estimated from the index is lower; and
   update the index based on the driving stress calculated during application of the effective voltage to the motor.

6. The cooling system according to claim 5, wherein when a period from start of application of an effective voltage to the motor until end of a shift of the valve body is referred to as a valve body shift period, the electronic control unit is configured to:
   repeatedly calculate the driving stress during the valve body shift period, and when one valve body shift period has ended, select the largest value of a plurality of driving stresses calculated during that valve body shift period as a maximum value of the driving stress; and
   integrate a plurality of the maximum values of the driving stresses, and calculate the index such that the calculated index has a value indicating lower durability of the control valve when an integrated value is larger.

7. The cooling system according to claim 6, wherein the electronic control unit is configured to set the maximum value of the driving stress in the valve body shift period to zero when the maximum value in the valve body shift period is smaller than a criterion value.

8. The cooling system according to claim 5, wherein when a period from start of application of an effective voltage to the motor until end of a shift of the valve body is referred to as a valve body shift period, the electronic control unit is configured to:
   repeatedly calculate the driving stress during the valve body shift period, and when one valve body shift period has ended, select the largest value of a plurality of driving stresses calculated during that valve body shift period as a maximum value of the driving stress; and
   calculate the index such that the calculated index has a value indicating lower durability of the control valve when the number of times the plurality of the maximum values of the driving stresses have become equal to or larger than a criterion value is larger.

9. The cooling system according to claim 8, wherein the electronic control unit is configured to set the maximum value of the driving stress in the valve body shift period to zero when the maximum value in the valve body shift period is smaller than a criterion value.

10. The cooling system according to claim 5, wherein when a period from start of application of an effective voltage to the motor until end of a shift of the valve body is referred to as a valve body shift period, the electronic control unit is configured to:
    repeatedly calculate the driving stress during the valve body shift period, and when one valve body shift period has ended, select the largest value of a plurality of driving stresses calculated during that valve body shift period as a maximum value of the driving stress; and
    obtain an average value of the driving stresses calculated during the one valve body shift period, and, by using the average value, calculate the index such that the calculated index has a value indicating low durability of the control valve.

11. The cooling system according to claim 10, wherein the electronic control unit is configured to set the maximum value of the driving stress in the valve body shift period to zero when the maximum value in the valve body shift period is smaller than a criterion value.

12. The cooling system according to claim 5, wherein when a period from start of application of an effective voltage to the motor until end of a shift of the valve body is referred to as a valve body shift period, the electronic control unit is configured to:

repeatedly calculate the driving stress during the valve body shift period, and when one valve body shift period has ended, select the largest value of a plurality of driving stresses as a maximum value of the driving stress; and integrate a plurality of differences, the difference being a value between the driving stress and a criterion value, to obtain an integrated value, and calculate the index such that the calculated index has a value indicating lower durability of the control valve when the integrated value is larger, when the driving stress is equal to or larger than the criterion value.

13. The cooling system according to claim 12, wherein the electronic control unit is configured to set the maximum value of the driving stress in the valve body shift period to zero when the maximum value in the valve body shift period is smaller than a criterion value.

* * * * *